United States Patent [19]
Sinski

[11] Patent Number: 5,947,319
[45] Date of Patent: Sep. 7, 1999

[54] PAINT CAN LID WITH WIRE HANDLE ENGAGEMENT

[75] Inventor: Michael W Sinski, Depew, N.Y.

[73] Assignee: Mark Zybert, Springville, N.Y.

[21] Appl. No.: 08/819,148

[22] Filed: Mar. 17, 1997

[51] Int. Cl.⁶ ................................................. B65D 45/00
[52] U.S. Cl. .................... 220/318; 220/254; 220/367.1; 220/756; 220/763; 220/774; 220/797
[58] Field of Search ...................... 220/212, 694, 220/699, 700, 701, 702, 318, 254, 367.1, 756, 762, 763, 774, 796, 797; 215/386, 354, 355, 320, 206, 399, 397

[56] References Cited

U.S. PATENT DOCUMENTS

| | | | |
|---|---|---|---|
| 2,254,141 | 8/1941 | Garcia | 220/756 X |
| 2,519,666 | 8/1950 | Knox | 220/756 X |
| 2,764,200 | 9/1956 | Gits | 220/254 |
| 2,812,100 | 11/1957 | Regan | 220/756 X |
| 3,108,710 | 10/1963 | Lange et al. | 220/797 X |
| 3,372,832 | 3/1968 | Yeater et al. | 220/254 |
| 3,441,172 | 4/1969 | Dike | 215/397 X |
| 3,815,736 | 6/1974 | Sedlak | 220/23.83 X |
| 3,865,267 | 2/1975 | Morris | 215/206 |
| 3,913,769 | 10/1975 | Scrocco et al. | 215/206 |
| 3,945,527 | 3/1976 | Pylant | 220/701 |
| 4,009,802 | 3/1977 | Hayduchok | 220/701 X |
| 4,022,344 | 5/1977 | Roamer | 220/701 X |
| 4,478,348 | 10/1984 | Cook | 220/763 X |
| 4,779,754 | 10/1988 | Ten Eyck et al. | 220/254 |
| 4,823,433 | 4/1989 | Curtis | 220/756 X |
| 4,832,293 | 5/1989 | Gizzi | 220/699 X |
| 5,165,562 | 11/1992 | Raney | 220/783 |
| 5,211,289 | 5/1993 | Matthews | 220/367.1 X |
| 5,348,549 | 9/1994 | Brown et al. | 220/254 X |

Primary Examiner—Stephen K. Cronin
Assistant Examiner—Robin Hylton

[57] ABSTRACT

The use of structure to engage the wire handle of a paint can to generate downward pressure between a paint can lid and the paint can. Seating in three positions are disclosed. These positions being within the seating channel of the paint can, in the opening of the paint can radially extending around the perimeter of the opening of the paint can and radially extending around the outer perimeter of the paint can top. Plural positions, having differing elevational placements, on the handle engagement member are explained. Alignment means are provided to ensured proper positioning during attachment to the paint can. One mode provides for temporary usage as a pouring lid during a painting procedure. A second mode provides for continuous usage, during the life of the paint, by ensuring complete sealing against air passage. Reusability of the paint can lid is provided by composition and construction. A design is disclosed capable of one piece forming during a molding process having pour cap and vent cap incorporated thereon along with retention means thereof.

13 Claims, 6 Drawing Sheets

PAINT CAN LID WITH WIRE HANDLE ENGAGEMENT

BACKGROUND

1. Field of the Invention

Generally the invention relates to a paint can lid for paint cans having wire handles. More specifically the invention relates to a replacement paint can lid adaptable to engage the wire handle of the paint can to apply pressure between the replacement paint can lid and the paint can.

2. Description of the Prior Art

Many attempts have been made to provide a replacement for the conventional lid associated with one, (1), US gallon paint cans. The conventional lid, that is the lid provided with the paint can, having disadvantages easily identifiable by prior inventors. The conventional lid is designed to be relatively flat with the surrounding top of the paint can while the lid is in place on the paint can. This design permits packaging and display of a plurality of paint cans in the minimal amount of space.

The most serious disadvantage resides in the requirement that the conventional lid must be removed to gain access to the paint contained within the can. While vast amounts of paint are distributed to building contractors, this distribution is generally made in containers holding at least five, (5), US gallons. Home owners and handypersons purchase a large quantity of paint distributed in one, (1), US gallon containers. These people routinely use less than the total contents of the container and reseal and store the remainder for future use. Such usage results in the lid being removed and replaced repeatedly during the life of the can of paint.

During usage, either by pouring or by the wiping of a brush against the opening, paint gains entry into the radial sealing bead of the can top. This sealing bead accepts a generally matching radial seating band of the can lid. Replacement of the lid is then messy with paint being expelled from the sealing bead. Such resealing of the unused portion of the paint occasionally being insufficient to provide an air tight seal. The paint may spoil during the duration of time before the next usage when an air tight seal is not formed.

Various attempts have been made to provide a reusable paint can lid capable of providing an air tight seal while providing for access to the paint without requiring removal of the lid. These attempts have been less efficient than desired. As such, it may be appreciated that there continues to be a need for a reusable paint can lid having a closable pour opening and structure to apply downward pressure on the lid against the can using the wire handle of the can. The present invention substantially fulfills these needs.

SUMMARY

In view of the foregoing disadvantages inherent in the known types of pourable paint can lids, your applicant has devised a paint can lid having a sealing pressure generating structure to apply pressure between the paint can lid and the paint can. This sealing pressure generating structure takes the form of a handle engagement member having a plurality of engagement positions. Each engagement position has a unique elevational height to the plane formed by the top of the paint can when attached. The handle of the paint can is positioned in a select one of these engagement positions to secure the paint can lid to the paint can. This securing of the paint can lid to the paint can provides for both pressure transference and retention properties during accidental over turning or even dropping of the combination. A seating band radially extends around the outer perimeter of the base of the paint can lid. This seating band engages the top of the paint can to form a seal therebetween. A pour opening penetrates the paint can lid and provides for access to the paint within the paint can following installation. Repeated usage of the paint can lid on subsequent paint cans is provided.

My invention resides not in any one of these features per se, but rather in the particular combinations of them herein disclosed and it is distinguished from the prior art in these particular combinations of these structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The primary object of the present invention is to provide for a paint can lid capable of satisfying the needs of paint users for a convenient and easily handled closure system.

Other objects include;

a) to provide for a secure fastening of the paint can lid to the paint can to prevent accidental displacement of the paint can lid when the combination is inadvertently knocked over or dropped.

b) to provide for engagement of the handle of the paint can to apply downward pressure on the paint can lid while installed.

c) to provide various engagement positions for the handle to permit various pressure levels between the paint can lid and the paint can.

d) to provide for the engagement position to securely retain the handle therein to prevent accidental removal therefrom.

e) to provide for a one piece molded paint can lid.

f) to provide for a domed shape within the design of the paint can lid to prevent deforming of the paint can lid by the applied downward pressure.

g) to provide for a paint can lid which may remain installed during numerous painting sessions.

h) to provide for a reusable paint can lid which may be cleaned following usage with one can of paint and reused repeatedly with other paint cans.

i) to provide for retention of the cap with the lid when the cap is removed from the opening.

j) to provide for a paint can lid to engage the paint can in the sealing channel of the paint can.

k) to provide for a paint can lid to engage the paint can within the opening of the paint can without entry into the sealing channel of the paint can.

l) to provide for a paint can lid to engage the paint can around the outer perimeter of the top of the paint can without entry into the sealing channel of the paint can.

m) to provide for easy, convenient and comfortable access to the handle for the user to carry the combination.

n) to provide for a pouring lid not having sealing means, the pouring lid to be deployed during a painting procedure where the pouring lid would be removed from the paint can following the painting procedure and the paint can would be resealed using the conventional lid supplied with the paint can for storage.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated the preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION

Referring now to the drawings where like reference numerals refer to like parts throughout the various views. While variations exist, depending upon manufacturer, generally all paint cans have a bead or trench formed radially extending around the top. This bead or trench is adaptable to receive a matching extension radially extending from the accompanying lid. Examples of such structures are depicted in FIG. 4 and FIG. 5 and identified as prior art.

Figure 4:
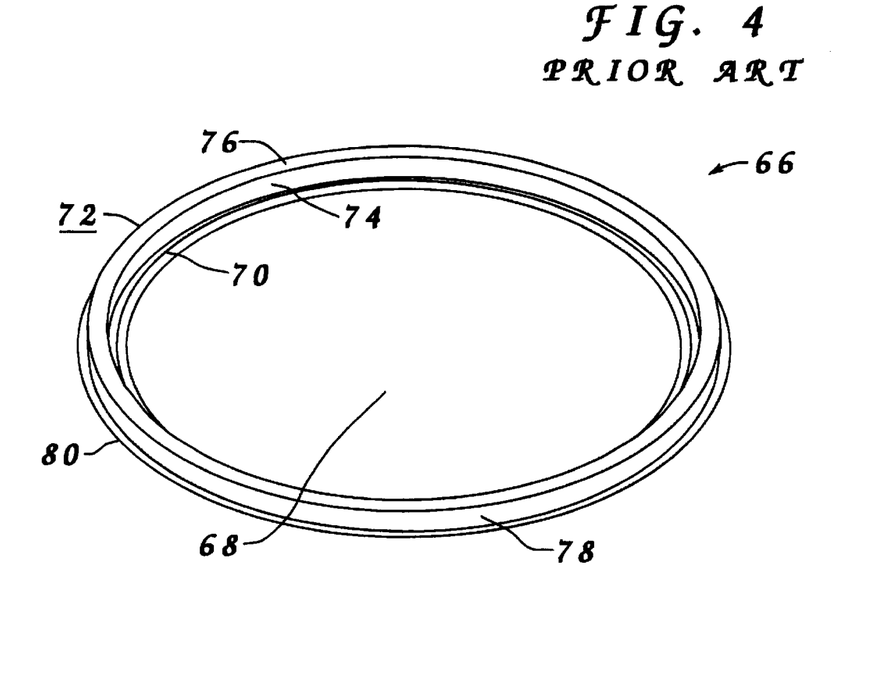
FIG. 4 is a perspective view of a prior art paint can lid.
Figure 5:
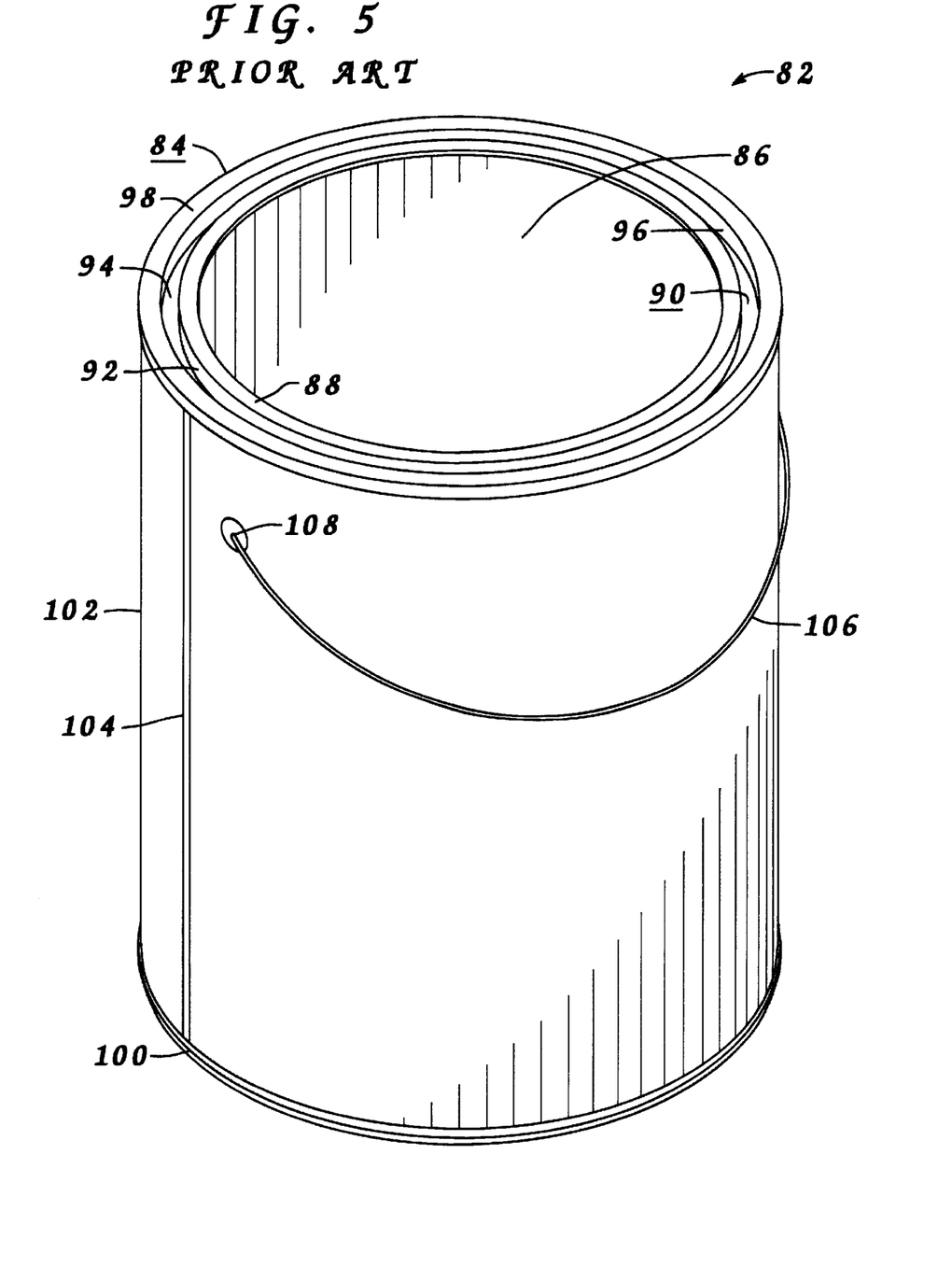
FIG. 5 is a perspective view of a prior art paint can.
Figure 6:
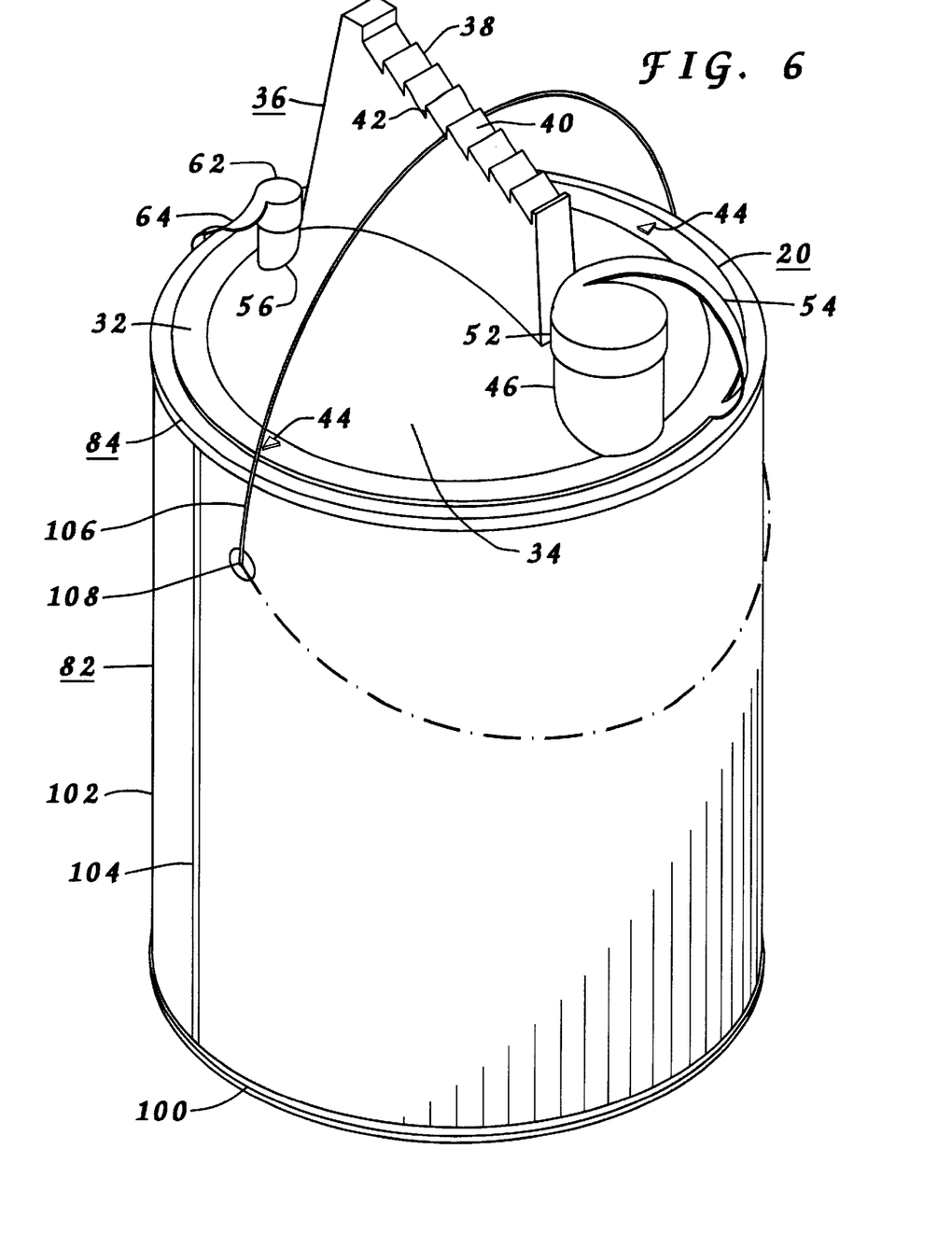
FIG. 6 is a perspective view of the replacement lid shown in FIG. 1 installed on the paint can shown in FIG. 5.

A paint can 82, shown in FIG. 5 and FIG. 6, is currently widely utilized for containing, storing, distributing and transporting paint. A paint can lid 66, shown in FIG. 4, is adaptable to close and secure an opening 86 of paint can 82. Paint can 82 has a top 84 and a base 100 each having a circular perimeter. Disposed between top 84 and base 100 is a radial wall 102 having opposing ends secured at a wall seam 104. Attached to radial wall 102 on opposing sides of paint can 82 are two pivotal handle anchors 108. A wire handle 106 has a respective end attached to each pivotal handle anchors 108. Wire handle 106 is provided to permit ease of transport and is pivotal through a range of motion from one side of paint can 82 upward and over top 84 to the opposing side of paint can 82. During transport by the user, wire handle 106 may be raised to a generally vertical position in the center of the range of motion and carried by wire handle 106.

Top 84 has penetrating therethrough opening 86 which is the only access point to the contents of paint can 82. Top 84 has a sealing channel 90, or lid groove, completely extending radially around the upper perimeter. Sealing channel 90 has an inner radial wall 92, a channel base 94 and an outer radial wall 96. Extending inward from sealing channel 90 is an inner sealing band 88. Extending outward from sealing channel 90 is an outer sealing band 98.

Paint can lid 66 has an orientation during installation on paint can 82 and is illustrated upside down, with the underside facing up, in FIG. 4. Paint can lid 66 has an inner surface 68 being generally planar with a circular perimeter. Surrounding inner surface 68 radiating outward is a raised band 70, then a seating band 72 and then an extending rim 80. Seating band 72 is formed of an inner radial surface 74, a lower seating surface 76 and an outer radial surface 78. During installation seating band 72 of paint can lid 66 is inserted into sealing channel 90 of paint can 82. Inner radial surface 74 contacts inner radial wall 92, lower seating surface 76 contacts channel base 94, outer radial surface 78 contacts outer radial wall 96 and raised band 70 contacts inner sealing band 88. These contacts provide an air tight seal for the contents of paint can 82. Sharp edges defining the various sections of paint can lid 66 and paint can 82 are depicted for illustrative purposes only and paint cans and lids having curved transitions are equally applicable to the instant invention.

Specifically referring now to FIG. 1, FIG. 2, FIG. 3, FIG. 6, FIG. 7 and FIG. 8 a replacement lid 20, or sections therefrom, is shown. While component assemblies, having detachable parts, is feasible to form lids having the required features, a particularly desirable lid is depicted as formed in a mold and being of one piece. A plastic is preferred as the construction material used to form the lid due to several properties associated with particular plastics. These properties include being easily and inexpensively molded into a product and that the resultant product is non corrosive, washable, durable, rigid and impermeable to air and liquid.

Figure 3:
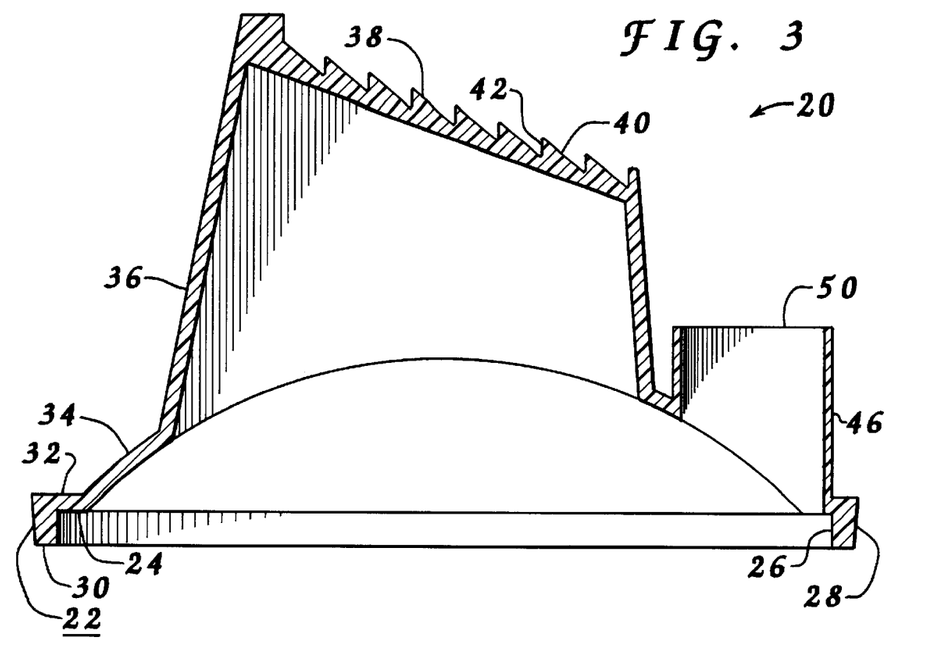
FIG. 3 is a sectional view as taken from the section lines shown in FIG. 1.
Figure 7:
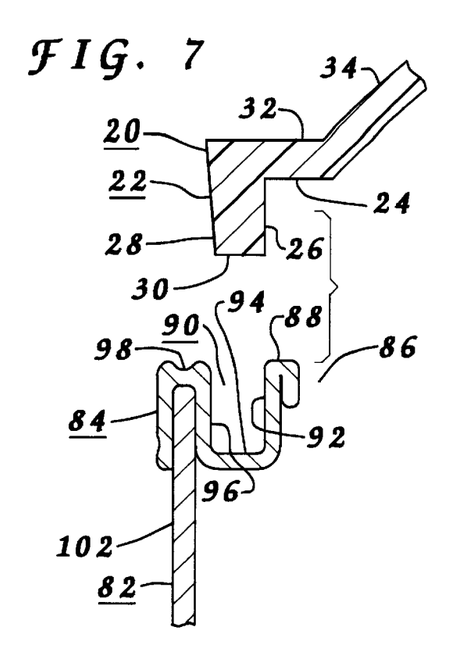
FIG. 7 is a partial sectional view of the replacement lid shown in FIG. 1 elevated above the paint can shown in FIG. 5.
Figure 8:
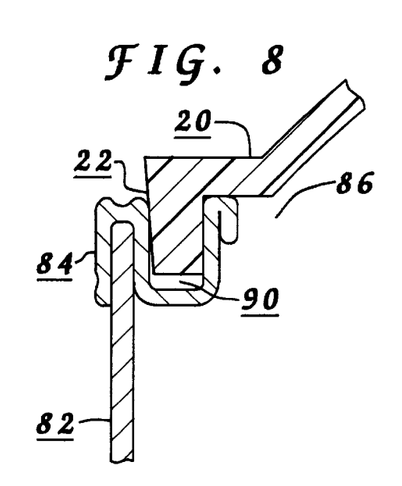
FIG. 8 is a partial sectional view of the items shown in FIG. 7 in an installed position.

Replacement lid 20 has a seating band 22 radially extending around the perimeter of replacement lid 20 and having various surfaces clearly shown in FIG. 3 and FIG. 7. These surfaces are an outer radial surface 28, a lower seating surface 30 and an inner radial surface 26. Outer radial surface 28 and inner radial surface 26 each radially extend around the perimeter of replacement lid 20 and preferably would intersect if extended downward. This tapering design provides for ease of insertion within sealing channel 90 of paint can 82 while providing for a firm contact by at least two of the three surfaces. FIG. 8 illustrates insertion of seating band 22 within sealing channel 90. In this example lower seating surface 30 does not contact channel base 94 while inner radial surface 26 is in contact with inner radial wall 92 and outer radial surface 28 is in contact with outer radial wall 96.

An encircling band 32 radially extends around the perimeter of replacement lid 20 and inward from seating band 22 on the topside of replacement lid 20. On the underside of replacement lid 20 and extending from seating band 22 is an upper seating surface 24 which extends radially around replacement lid 20. Upper seating surface 24 preferably contacts inner sealing band 88 while installed to provide additional sealing properties, as shown in FIG. 8.

The application of downward pressure on replacement lid 20 to maintain and ensure a proper seating relative to paint can 82 is one of the principle features of the invention. The unique use of wire handle 106 to provide this downward pressure is provided by the instant invention. Due to the height of wire handle 106, relative to the plane formed across top 84, elevation of an engagement member is required. Additionally, it is important to ensure that the downward pressure being applied is transferred without being absorbed by replacement lid 20 being compressed or otherwise deformed. A dome 34 radially extends around replacement lid 20 and radially contacts and rises above encircling band 32. Dome 34 is capable of having downward pressure applied thereto without yielding as a flat surface would tend to do.

Dome 34 has extending therefrom a handle engagement member 36 having a plurality of positioning steps 38. Each positioning step 38 has a base 40 and an engagement side 42. Each positioning step 38 has a different elevational height from the plane formed by seating band 22. This varied elevation height placements provide for engagement by wire handle 106 in a select position for desired pressure application. Additionally, during prolonged usage wire handle 106 may begin to conform to the pressure being applied and a reduction in the applied pressure may occur. If this situation occurs, the user would simply move wire handle 106 to a higher positional step 38 to restore the desired pressure transference level.

As shown in FIG. 6 wire handle 106 will contact a select base 40 and an associative engagement side 42 when installed. Opposing alignment guide marks are situated on opposing sides of encircling band 32 and their connected alignment perpendicularly intersect handle engagement member 36. Alignment guide marks 44 may be used by the user to align replacement lid 20 on paint can 82 during installation. Viewing the installation from above the user will position alignment guide marks 44 with wire handle 106 and/or pivotal handle anchors 108 while wire handle 106 is in the resting position as shown in FIG. 5.

Once replacement lid 20 is installed it is necessary to provide for access to the paint contained in paint can 82 without requiring removal of replacement lid 20. A pour spout 46 is provided which penetrates replacement lid 20. Pour spout 46 is preferably aligned with handle engagement member 36 so that wire handle 106 is clear of the path of pouring. This placement provides the user with convenient handling features by permitting use of wire handle 106 during a pouring procedure. Pour spout 46 has a pour opening 48 and an upper terminus 50. Terminus meaning the boundary or limit, upper terminus 50 is the upper limit or extent of pour opening 48. While various shapes are possible, such as tapered, a planar shape is expedient to provide for ease of sealing. A pour cap 52 capable of sealing pour opening 48 is provided while a pour cap retention member 54 ensures that pour cap 52 remains with replacement lid 20 when uncapped.

Figure 13:
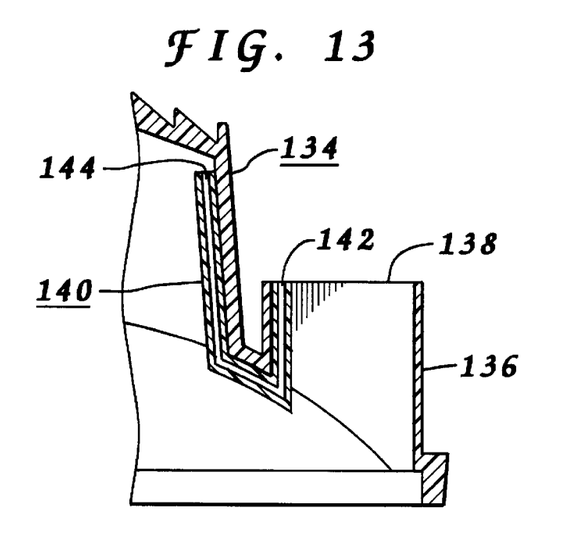
FIG. 13 is a partial sectional view of a lid.

Due to the thickness of paint, it is preferred to provide a separate vent to prevent the forming of a vacuum during the pouring procedure. A vent spout 56 is provided which penetrates replacement lid 20. Vent spout 56 is preferably situated on the opposing side of replacement lid 20 from pour spout 46. Vent spout 56 has a vent opening 58 and an upper terminus 60. As detailed above, various shapes are possible for pour spout 46, similarly vent spout 56 may have many shapes. A vent cap 62 capable of sealing vent opening 58 is provided while a vent cap retention member 64 ensures that vent cap 62 remains with replacement lid 20 when uncapped. By preference handle engagement member 36 should have optimum length to provide for the maximum number of elevational positions to positioning steps 38. Vent spout 56 may be offset from aligned with pour spout 46, as depicted within the various views. Alternatively, a venting tube 140, as shown in FIG. 13, may be used to provide venting during the pouring procedure. A lid 134 having a pour spout 136 with an upper terminus 138 is shown. Attached within pour spout 136 is venting tube 140 having an outer opening 142 and an inner opening 144. Outer opening 142 being in direct communication with inner opening 144 and permitting the free passage of air therebetween. Inner opening 144 would be situated within lid 134 such that it remains well above the upper paint level during pouring. Venting tube 140 would be sealed to air when pour spout 136 is sealed.

Figure 1:
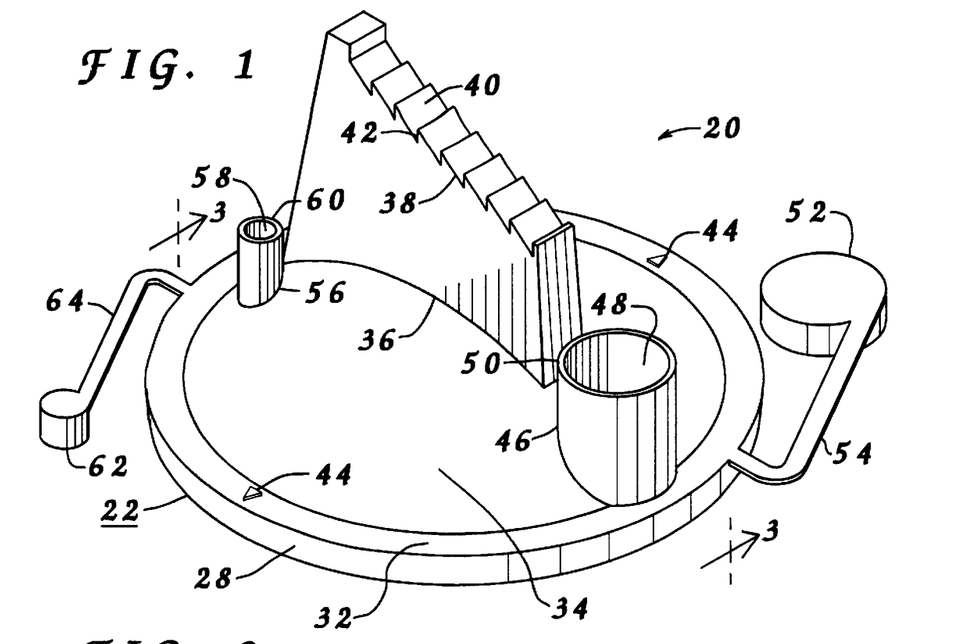
FIG. 1 is a perspective view of a replacement lid.
Figure 2:
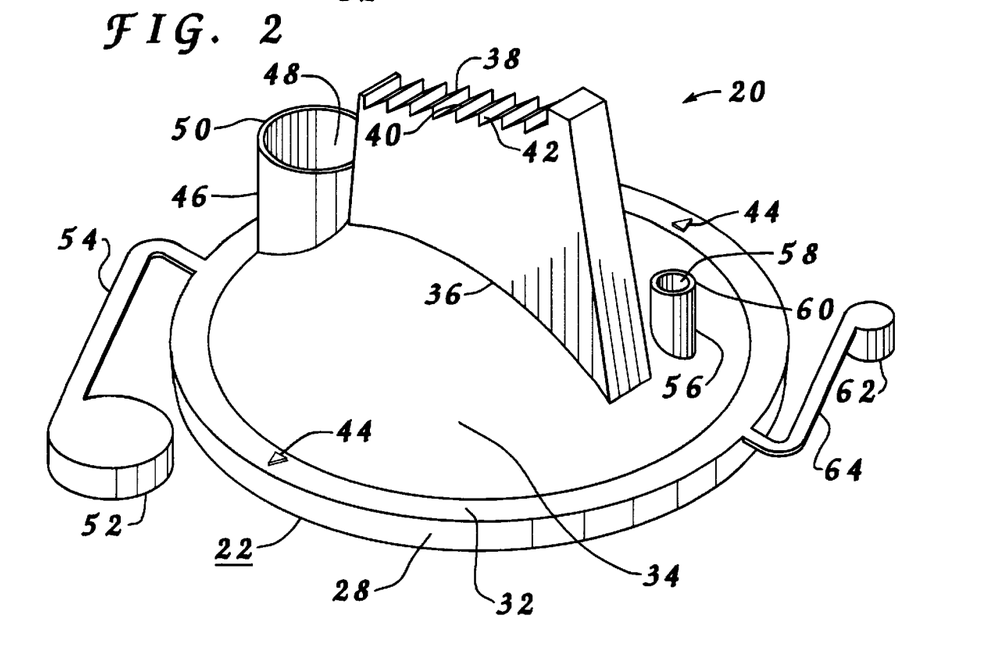
FIG. 2 is a perspective view of the replacement lid shown in FIG. 1 from the opposing side.

FIG. 1 and FIG. 2 show replacement lid 20 with pour opening 48 and vent opening 58 open as would be present during the pouring procedure. FIG. 6 shows replacement lid 20 with pour cap 52 sealing pour spout 46 and vent cap 62 sealing vent spout 56 as would preferably occur during all times other than during the pouring procedure. Shaking of paint can 82 while replacement lid 20 seals against leakage provides for remixing the paint prior to beginning a painting procedure.

Replacement lid 20 may be adapted for use as a pouring lid during a painting procedure. In this usage pour cap 52 and vent cap 62 would be eliminated thereby preventing the sealing of paint can 82 during storage. This usage would result in the removal of replacement lid 20 following the painting procedure and it being cleaned along with the other tools used by the painter. Movement of replacement lid 20 from one paint can 82 to another following depletion of the first paint supply is easily facilitated by the user.

Figure 9:
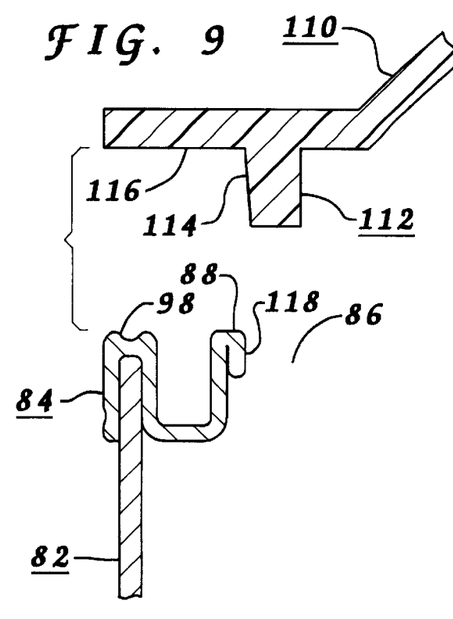
FIG. 9 is a partial sectional view of a lid elevated above the paint can shown in FIG. 5.
Figure 10:
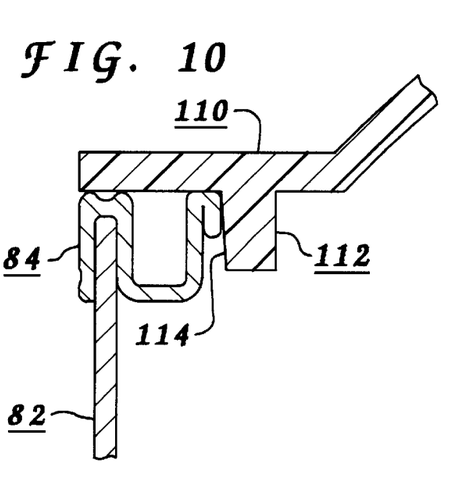
FIG. 10 is a partial sectional view of the items shown in FIG. 9 in an installed position.

While the use of sealing channel 90 of paint can 82 has been previously disclosed, other adaptations are possible. A first adaptation, shown in FIG. 9 and FIG. 10, have a lid 110 having a seating band 112 radially disposed on the underside. Seating band 112 has an outer radial surface 114. Radially extending outward from seating band 112 is an overlay surface 116. Top 84 of paint can 82 has an inner radial surface 118 which extends radially to define opening 86. When installed, as shown in FIG. 10, outer radial surface 114 of lid 110 contacts inner radial surface 118 of top 84 and overlay surface 116 of lid 110 contacts inner sealing band 88 and outer sealing band 98 of top 84. This configuration provides for sealing of opening 86 while bypassing insertion within sealing channel 90 of top 84.

Figure 11:
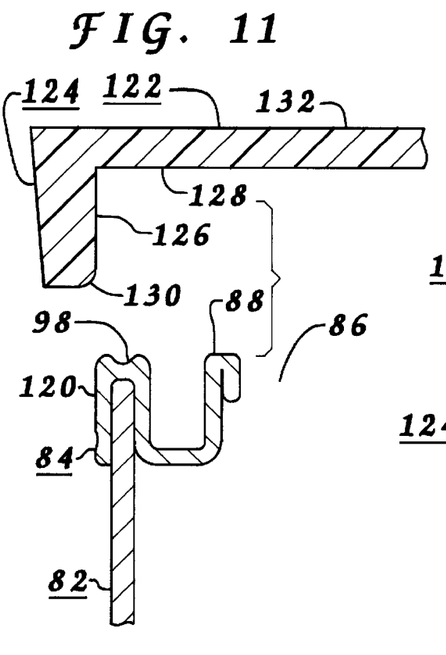
FIG. 11 is a partial sectional view of a lid elevated above the paint can shown in FIG. 5.
Figure 12:
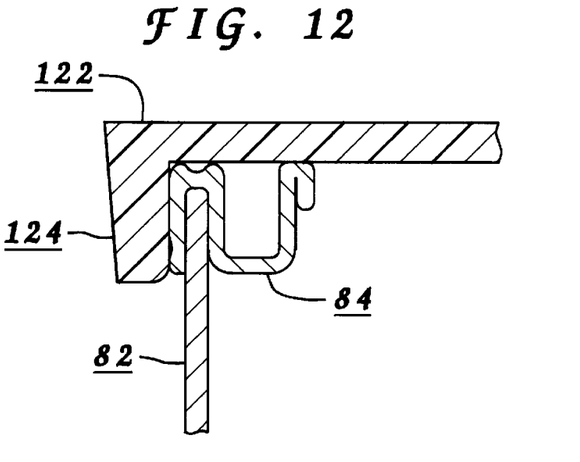
FIG. 12 is a partial sectional view of the items shown in FIG. 11 in an installed position.

A second adaptation, shown in FIG. 11 and FIG. 12, have a lid 122 having a seating band 124 radially disposed on the underside. Seating band 124 has an inner radial surface 126. Radially extending inward from seating band 124 is an upper seating surface 128. Top 84 of paint can 82 has an outer radial surface 120. When installed, as shown in FIG. 12, inner radial surface 126 of lid 122 contacts outer radial surface 120 of top 84 and upper seating surface 128 of lid 122 contacts inner sealing surface 88 and outer sealing surface 98 of top 84. This configuration provides for sealing of opening 86 while bypassing insertion within sealing channel 90 of top 84.

FIG. 11 illustrates the usage of a rounded edge 130 between two intersecting surfaces. Such usage is applicable to all disclosed intersections. Also shown is lid 122 having a planar surface 132. While a domed shape is preferred for the reasons set forth above, a flat surface is applicable if sufficient structure is provided to prevent deforming. One such example structure provides for extension to the perimeter of the lid by the structure which engages the wire handle of the paint can.

With respect to the above description then, it is to be realized that the optimum dimensional relationships for the parts of the invention, to include variations in size, material, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling with the scope of the invention.

I claim:

1. A lid for a paint can, the lid comprising:
   a) a seating band radially disposed on a base of the lid and extending from the base, the seating band to provide for radial contact with a top of the paint can to provide for sealing of an opening in the top of the paint can by the lid;
   b) a pour opening penetrating the lid, the pour opening to provide for passage of paint from the can while the lid is providing sealing of the opening of the paint can;
   c) a handle engagement member having a plurality of engagement positions, each of the engagement positions having a unique elevational height to a plane formed by the seating band of the lid, the handle engagement member having a fixed position on the lid relative to the seating band, the handle engagement member to provide for engaging a wire handle of the paint can while the lid is sealing the opening of the paint can, the handle engagement member cooperating with the wire handle to apply pressure between the lid and the paint can to retain the sealing of the opening of the paint can by the seating band of the lid.

2. The lid defined in claim 1 further comprising a pour sealing member to provide for selective sealing of the pour opening of the lid.

3. The lid defined in claim 1 wherein the seating band contacts a radial perimeter of the opening of the paint can.

4. The lid defined in claim 1 wherein the seating band contacts a radial outer perimeter of the top of the paint can.

5. The lid defined in claim 1 further comprising vent means to provide for passage of air through the lid to prevent a vacuum from forming during a pouring procedure.

6. A lid member to replace a lid on a paint can, the paint can having a top, an opening, a lid groove, a radial side wall and a wire handle, the opening penetrating the top and closable by the lid, the lid groove incorporated into the top and disposed radially around the opening, the wire handle having opposing ends, the opposing ends attached to the radial side wall on opposing sides of the paint can, the wire handle pivotally moveable throughout a range of motion, the lid member comprising:
   a) a seating band radially extending from the lid member, the seating band for insertion into the lid groove of the can;
   b) a pour opening to provide for a passage through the lid member, the pour opening having an upper terminus, the pour opening providing for pouring paint from the paint can;
   c) a pour opening sealing member to provide for sealing of the pour opening at the upper terminus of the pour opening, the pour opening sealing member having an attached state and a detached state, the attached state to provide for sealing the pour opening, the detached state to provide for a pouring of paint from the pour opening;
   d) a handle engaging member having a plurality of engagement positions, each engagement position having a unique elevational height relative to the seating band of the lid member, the handle engagement member having a fixed position on the lid member relative to the seating band, the handle engagement member to provide for engagement of the wire handle of the paint can to cooperate with the wire handle to apply pressure on the lid member against the paint can to retain the lid member in an installed position on the paint can, the installed position placing the seating band of the lid member within the lid groove of the paint can.

7. The lid member defined in claim 6 further comprising a venting member to provide for air intake into the paint can to prevent a vacuum from forming, the vacuum capable of restricting pouring of paint from the can.

8. The lid member defined in claim 7 further comprising venting member sealing means to provide for sealing the venting member against air passage.

9. The lid member defined in claim 6 wherein the lid member further comprises a dome member and wherein the handle engaging member and the pour opening are positioned on the dome member, the dome member having a base, the base having a circular shape and radially positioned on the lid member parallel to the seating band.

10. The lid member defined in claim 6 further comprising two opposing alignment marks to provide for placement of the lid member relative to the wire handle of the paint can during installation.

11. The lid member defined in claim 6 further comprising pour opening sealing member retention means to provide for containment of the pour opening sealing member relative to the lid member while the pour opening sealing member is in the detached state.

12. A paint can lid replacement member to provide for replacement of a lid on a paint can, the paint can having a top, an opening, a lid groove, a base, a radial side wall and a wire handle, the top circular in shape, the opening penetrating the top and closable by the lid, the lid groove incorporated into the top and disposed radially around the opening and having an inner upper surface, an outer upper surface and a channel bottom, the base circular in shape and forming the bottom of the paint can, the radial side wall extending from the base to the top, the wire handle having opposing ends, the opposing ends attached to the radial side wall on opposing sides of the paint can, the wire handle to provide for pivotal movement throughout a range of motion, the range of motion placing the wire handle on opposing sides of the paint can, the paint can lid replacement member comprising:
   a) a seating band radially extending from the paint can lid replacement member, the seating band to provide for insertion into the lid groove of the can, the seating band comprising:
      1) an inner surface having an upper extent and a lower extent;
      2) an outer surface having an upper extent and a lower extent;

3) a transition surface disposed between and connecting the lower extent of the inner surface and the lower extent of the outer surface;

b) a contact surface radially extending inward from the upper extent of the inner surface, the contact surface to contact the inner upper surface of the lid groove of the paint can;

c) a pour opening to provide for a passage through the paint can lid replacement member, the pour opening having an upper terminus, the pour opening for pouring paint from the paint can;

d) a pour opening sealing member to provide for sealing of the pour opening at the upper terminus of the pour opening, the pour opening sealing member having an attached state and a detached state, the attached state to provide for sealing the pour opening, the detached state to provide for a pouring of paint from the pour opening;

e) pour opening sealing member retention means to provide for retention of the pour opening sealing member with the paint can lid replacement member while in the detached state;

f) a venting member to provide for air intake into the paint can to prevent a vacuum from forming, the vacuum capable of restricting pouring of paint from the can;

g) venting member sealing means to provide for sealing the venting member against air passage;

h) a handle engaging member having a plurality of engagement positions, each engagement position having a unique elevational height relative to the transition surface of the seating band, the handle engaging member having a fixed position on the paint can lid replacement member relative to the seating band, the handle engagement member to provide for engagement of the wire handle of the paint can to cooperate with the wire handle to apply pressure on the paint can lid replacement member against the paint can to retain the paint can lid replacement member in an installed position on the paint can, the installed position placing the seating band of the paint can lid replacement member within the lid groove of the paint can.

13. The lid member defined in claim 12 wherein the lid member further comprises a dome member and wherein the handle engaging member, the pour opening and the venting member are positioned on the dome member, the dome member having a base, the base having a circular shape and radially positioned on the lid member parallel to the seating band.

* * * * *